United States Patent
Kitai et al.

(10) Patent No.: US 11,391,368 B2
(45) Date of Patent: Jul. 19, 2022

(54) DRIVE APPARATUS FOR HYBRID VEHICLE

(71) Applicants: Toyota Jidosha Kabushiki Kaisha, Toyota (JP); Aisin AW Co., Ltd., Anjo (JP)

(72) Inventors: Shinya Kitai, Toyota (JP); Kazuhiro Yamamoto, Nagakute (JP); Kazuki Kojima, Anjo (JP); Hironori Sugiura, Anjo (JP); Ryuki Sakamoto, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 17/202,517

(22) Filed: Mar. 16, 2021

(65) Prior Publication Data
US 2021/0285538 A1    Sep. 16, 2021

(30) Foreign Application Priority Data
Mar. 16, 2020    (JP) .............................. JP2020-045791

(51) Int. Cl.
*F16H 61/12*    (2010.01)
*F16H 61/00*    (2006.01)
*F16H 61/02*    (2006.01)

(52) U.S. Cl.
CPC ......... *F16H 61/12* (2013.01); *F16H 61/0006* (2013.01); *F16H 61/0206* (2013.01);
(Continued)

(58) Field of Classification Search
None
See application file for complete search history.

(56) References Cited

U.S. PATENT DOCUMENTS 9,150,218 B2 * 10/2015 Makabe ................ B60W 20/40
10,093,305 B2 * 10/2018 Shimizu ................ B60W 20/14
(Continued)

FOREIGN PATENT DOCUMENTS

CN    101898557 A  * 12/2010
CN    108544916 A  *  9/2018  ............ B60W 10/26
(Continued)

OTHER PUBLICATIONS

EP 21162289 EU search report (Year: 2020).*
FR 3077258 machine translation (Year: 2021).*

*Primary Examiner* — Dirk Wright
(74) *Attorney, Agent, or Firm* — Oblon, McClelland, Maier & Neustadt, L.L.P.

(57) ABSTRACT

A drive apparatus for a hybrid vehicle includes: (a) a hybrid drive unit having (a-1) an automatic transmission, (a-2) a first rotating machine and (a-3) an engine connected to the first rotating machine through a hydraulically-operated connecting/disconnecting device; (b) an electric drive unit including a second rotating machine; and (c) a hybrid control device configured, in event of an anomaly that disables a shift control of the automatic transmission, to generate an electric power by causing the first rotating machine to be rotated by the engine and drive the hybrid vehicle to run by causing the second rotating machine of the electric drive unit to be operated with use of the generated electric power, in a state in which a power transmission through the automatic transmission is cut off and the connecting/disconnecting device is engaged.

6 Claims, 8 Drawing Sheets

(52) U.S. Cl.
CPC ............... *F16H 2061/0209* (2013.01); *F16H 2061/1252* (2013.01)

(56) References Cited

U.S. PATENT DOCUMENTS

| | | | |
|---|---|---|---|
| 10,406,935 B2 * | 9/2019 | Shimizu | ................ B60K 6/448 |
| 2007/0117678 A1 | 5/2007 | Fukushima et al. | |
| 2017/0282891 A1 * | 10/2017 | Shimizu | ................ B60L 50/16 |
| 2021/0107450 A1 * | 4/2021 | Usui | .................... B60W 20/50 |

FOREIGN PATENT DOCUMENTS

| | | | | |
|---|---|---|---|---|
| CN | 109466540 A | * | 3/2019 | |
| CN | 110667368 A | * | 1/2020 | |
| DE | 102014215259 A1 | * | 2/2016 | ........ B60W 50/0097 |
| EP | 2708457 A1 | * | 3/2014 | ............ B60L 3/0061 |
| EP | 3216639 A1 | * | 9/2017 | ............ B60W 10/06 |
| EP | 3616958 A1 | * | 3/2020 | ............... B60K 6/28 |
| FR | 3034737 A1 | * | 10/2016 | ............ B60W 10/06 |
| FR | 3081011 A1 | * | 11/2019 | ............ B60W 10/02 |
| FR | 3077258 B1 | * | 1/2020 | ............ B60W 20/13 |
| JP | 2007-146901 A | | 6/2007 | |
| JP | 2008279957 A | * | 11/2008 | |
| JP | 2010215007 A | * | 9/2010 | |
| JP | 2012-035692 A | | 2/2012 | |

\* cited by examiner

| GEAR POSITION | C1 | C2 | C3 | C4 | B1 | B2 |
|---|---|---|---|---|---|---|
| 1st | O | | | | | O |
| 2nd | O | | | | O | |
| 3rd | O | | O | | | |
| 4th | O | | | O | | |
| 5th | O | O | | | | |
| 6th | | O | | O | | |
| 7th | | O | O | | | |
| 8th | | O | | | O | |
| Rev1 | | | O | | | O |
| Rev2 | | | | O | | O |
| N | | | | | | |

(O : ENGAGED)

DRIVE APPARATUS FOR HYBRID VEHICLE

This application claims priority from Japanese Patent Application No. 2020-045791 filed on Mar. 16, 2020, the disclosure of which is herein incorporated by reference in its entirety.

FIELD OF THE INVENTION

The present invention relates to a drive apparatus for a hybrid vehicle, and more particularly to controls executed in event of an anomaly that disables a shift control of an automatic transmission.

BACKGROUND OF THE INVENTION

There is known a vehicle having (a) an automatic transmission including a plurality of hydraulically-operated shifting engagement devices and configured to establish a plurality of gear positions depending on engaged/released states of the shifting engagement devices and (b) a hydraulic control unit including a plurality of electromagnetic valves configured to switch the engaged/released states of the shifting engagement devices. A vehicle disclosed in JP-2007-146901A is an example of such a vehicle. In the vehicle disclosed in this Japanese Patent Application Publication, in event of an anomaly that disables a shift control of the automatic transmission, one of a higher-speed-side fail-safe gear position and a lower-speed-side fail-safe gear position is selected depending on a gear position established shortly before occurrence of the anomaly, and the vehicle is capable of performing an evacuation running with the selected one of the fail-safe gear positions being established.

On the other hand, JP-2012-35692A as another Japanese Patent Application Publication discloses a hybrid vehicle provided with a hybrid drive unit that includes (a) an automatic transmission including a plurality of hydraulically-operated shifting engagement devices and configured to establish a plurality of gear positions depending on engaged/released states of the shifting engagement devices, (b) a first rotating machine disposed on an upstream side of the automatic transmission, and (c) an engine disposed on an upstream side of the first rotating machine and connected to the first rotating machine through a hydraulically-operated connecting/disconnecting device such that the engine is disconnectable from the first rotating machine, (d) wherein the hybrid drive unit is configured to drive one of front and rear wheels of the vehicle by using the engine and the first rotating machine as running drive power sources. In this hybrid vehicle provided with such a hybrid drive unit, too, in event of an anomaly that disables a shift control of the automatic transmission, it might be possible to cause the vehicle to perform an evacuation running with a fail-safe gear position being established, as in the vehicle disposed in the above-identified JP-2007-146901A.

SUMMARY OF THE INVENTION

However, since each of the above-described conventional vehicles is caused to perform the evacuation running with a certain fail-safe gear position being established, there is a problem that a staring performance, an uphill climbing performance and/or a maximum running speed is limited depending on a gear ratio provided by the established fail-safe gear position.

The present invention was made in view of the background art described above. It is therefore an object of the present invention to improve a running performance in an evacuation running in event of an anomaly that disables a shift control of an automatic transmission.

The object indicated above is achieved according to the following aspects of the present invention.

According to a first aspect of the invention, there is provided a drive apparatus for a hybrid vehicle, the drive apparatus comprising: (a) a hybrid drive unit including (a-1) an automatic transmission including a plurality of hydraulically-operated shifting engagement devices and configured to establish a plurality of gear positions depending on engaged/released states of the shifting engagement devices, (a-2) a first rotating machine, and (a-3) an engine connected to the first rotating machine through a hydraulically-operated connecting/disconnecting device such that the engine is disconnectable from the first rotating machine that is disposed in a power transmission path between the automatic transmission and the engine, and wherein the hybrid drive unit is configured to drive one of front and rear wheels of the hybrid vehicle through the automatic transmission, with the engine and the first rotating machine being used as running drive power sources; (b) an electric drive unit including a second rotating machine and configured to drive the other of the front and rear wheels, with the second rotating machine being used as a running drive power source; (c) a hydraulic control unit including a plurality of electromagnetic valves configured to switch the engaged/released states of the shifting engagement devices and an engaged/released state of the connecting/disconnecting device; and (d) a hybrid control device configured, in event of an anomaly that disables a shift control of the automatic transmission, to generate an electric power by causing the first rotating machine to be rotated by the engine and drive the hybrid vehicle to run by causing the second rotating machine of the electric drive unit to be operated with use of the generated electric power, in a state in which a power transmission through the automatic transmission is cut off and the connecting/disconnecting device is engaged.

According to a second aspect of the invention, in the drive apparatus according to the first aspect of the invention, the hydraulic control unit includes: (c-1) a failure-determination electromagnetic valve configured to switch an output state of a failure determination fluid in event of a power OFF failure by which supply of the electric power to all of the electromagnetic valves is cut off, and (c-2) a fail-safe valve including (c-2-i) a switch port to which the failure determination fluid is to be supplied, (c-2-ii) a connection port connected to a discharge fluid passage through which a working fluid is to be discharged from the connecting/disconnecting device so as to release the connecting/disconnecting device, (c-2-iii) a drain port through which the working fluid supplied to the connection port from the discharge fluid passage is to be drained, and (c-2-iv) an engagement port to which a failure-case engagement fluid is to be supplied for engaging the connecting/disconnecting device, wherein the fail-safe valve is to be switched between a normal-case connection state and a failure-case connection state, such that the connection port and the drain port are in communication with each other for draining the working fluid supplied from the discharge fluid passage when the fail-safe valve is placed in the normal-case connection state, and such that the connection port and the engagement port are in communication with each other for supplying the failure-case engagement fluid to the discharge fluid passage so as to engage the connecting/disconnecting device when the fail-safe valve is placed in the failure-case connection state, and wherein the fail-safe valve is normally placed in the normal-case connection state, and is switched from the normal-case connection state to the failure-case connection state when the output state of the failure determination fluid is switched in the event of the power OFF failure.

According to a third aspect of the invention, in the drive apparatus according to the second aspect of the invention, the failure-determination electromagnetic valve is a normally-open electromagnetic valve that is configured to output the failure determination fluid in the event of the power OFF failure, wherein the fail-safe valve includes a spool and a spring, such that the fail-safe valve is placed in the normal-case connection state, with the spool being held in a normal-side position by a biasing force of the spring, and such that the fail-safe valve is switched from the normal-case connection state to the failure-case connection state, when the failure determination fluid is supplied to the switch port whereby the spool is moved to a failure-side position against the biasing force of the spring.

According to a fourth aspect of the invention, in the drive apparatus according to the third aspect of the invention, the failure determination fluid is supplied as the failure-case engagement fluid to the engagement port of the fail-safe valve.

According to a fifth aspect of the invention, in the drive apparatus according to the second or third aspect of the invention, the working fluid regulated to a line pressure is supplied as the failure-case engagement fluid to the engagement port of the fail-safe valve.

According to a sixth aspect of the invention, in the drive apparatus according to any one of the first through fifth aspect of the invention, the electromagnetic valves are provided for the respective shifting engagement devices in the hydraulic control unit, such that, when the electric power is supplied to each of the electromagnetic valves, a corresponding one of the shifting engagement devices is engaged by the working fluid that is supplied to the corresponding one of the shifting engagement devices from the each of the electromagnetic valves, and such that, when supply of the electric power to each of the electromagnetic valves is stopped, a corresponding one of the shifting engagement devices is released, wherein the automatic transmission is placed in a power-transmission cut-off state with all of the shifting engagement devices being released, in the event of the anomaly that is a power OFF failure by which supply of the electric power to all of the electromagnetic valves is cut off.

In the drive apparatus according to the first aspect of the invention, in the event of the anomaly that disenables the shift control of the automatic transmission, the electric power is generated by causing the first rotating machine to be rotated by the engine, and the hybrid vehicle is driven to run by causing the second rotating machine of the electric drive unit to be operated with use of the generated electric power, in a state in which the power transmission through the automatic transmission is cut off and the connecting/disconnecting device is engaged. That is, an evacuation running of the vehicle is performed in a series hybrid drive system, so that a running performance of the vehicle such as a starting performance, an uphill climbing performance and a maximum running speed can be improved as a whole, as compared with a conventional drive apparatus by which the evacuation running is performed with the automatic transmission being placed in a certain gear position as a fail-safe gear position.

In the drive apparatus according to the second aspect of the invention, the hydraulic control unit is provided with the fail-safe valve and the failure-determination electromagnetic valve that is configured to switch the output state of the failure determination fluid in the event of the power OFF failure. When the output state of the failure determination fluid is switched as a result of occurrence of the power OFF failure, the fail-safe valve is placed in the failure-case connection state in which the connection port and the engagement port are brought into communication with each other whereby the failure-case engagement fluid is supplied to the discharge fluid passage so as to cause the connecting/disconnecting device to be engaged by the failure-case engagement fluid. That is, in the event of the anomaly that disables the shift control by the power OFF failure by which the supply of the electric power to all of the electromagnetic valves is cut off, the connecting/disconnecting device is automatically placed in its connection state as a result of occurrence of the power OFF failure, it is possible to drive and rotate the first rotating machine by the engine through the connecting/disconnecting device so as to generate the electric power, even without an additional control being required, so that the evacuation running of the vehicle can be more appropriately performed in the series hybrid drive system.

In the drive apparatus according to the third aspect of the invention, the failure-determination electromagnetic valve is the normally-open electromagnetic valve that is configured to output the failure determination fluid in the event of the power OFF failure, and the fail-safe valve is switched from the normal-case connection state to the failure-case connection state against the biasing force of the spring by the output of the failure determination fluid, so that the connecting/disconnecting device is appropriately placed in its connection state as a result of occurrence of the power OFF failure. Further, the hydraulic control unit can be made simple in construction, where the failure determination fluid is supplied as the failure-case engagement fluid to the engagement port of the fail-safe valve, as in the fourth aspect of the invention.

In the drive apparatus according to the fifth aspect of the invention, the working fluid regulated to the line pressure is supplied as the failure-case engagement fluid to the engagement port of the fail-safe valve, so that the connecting/disconnecting device is appropriately placed in its connection state, based on the line pressure to which the working fluid is regulated.

In the drive apparatus according to the sixth aspect of the invention, the electromagnetic valves are provided for the respective shifting engagement devices, such that each of the shifting engagement devices is engaged with a corresponding one of the electromagnetic valves being energized, and is released with the corresponding one of the electromagnetic valves being de-energized, and such that, in the event of the anomaly by the power OFF failure, all of the shifting engagement devices are released whereby the automatic transmission is placed in the power-transmission cut-off state. Thus, the evacuation running of the vehicle can be appropriately performed in the series hybrid drive system in which the first rotating machine is driven and rotated by the engine so as to generate the electric power and the second rotating machine is operated by the generated electric power.

DETAILED DESCRIPTION OF PREFERRED EMBODIMENTS

Figure 1:
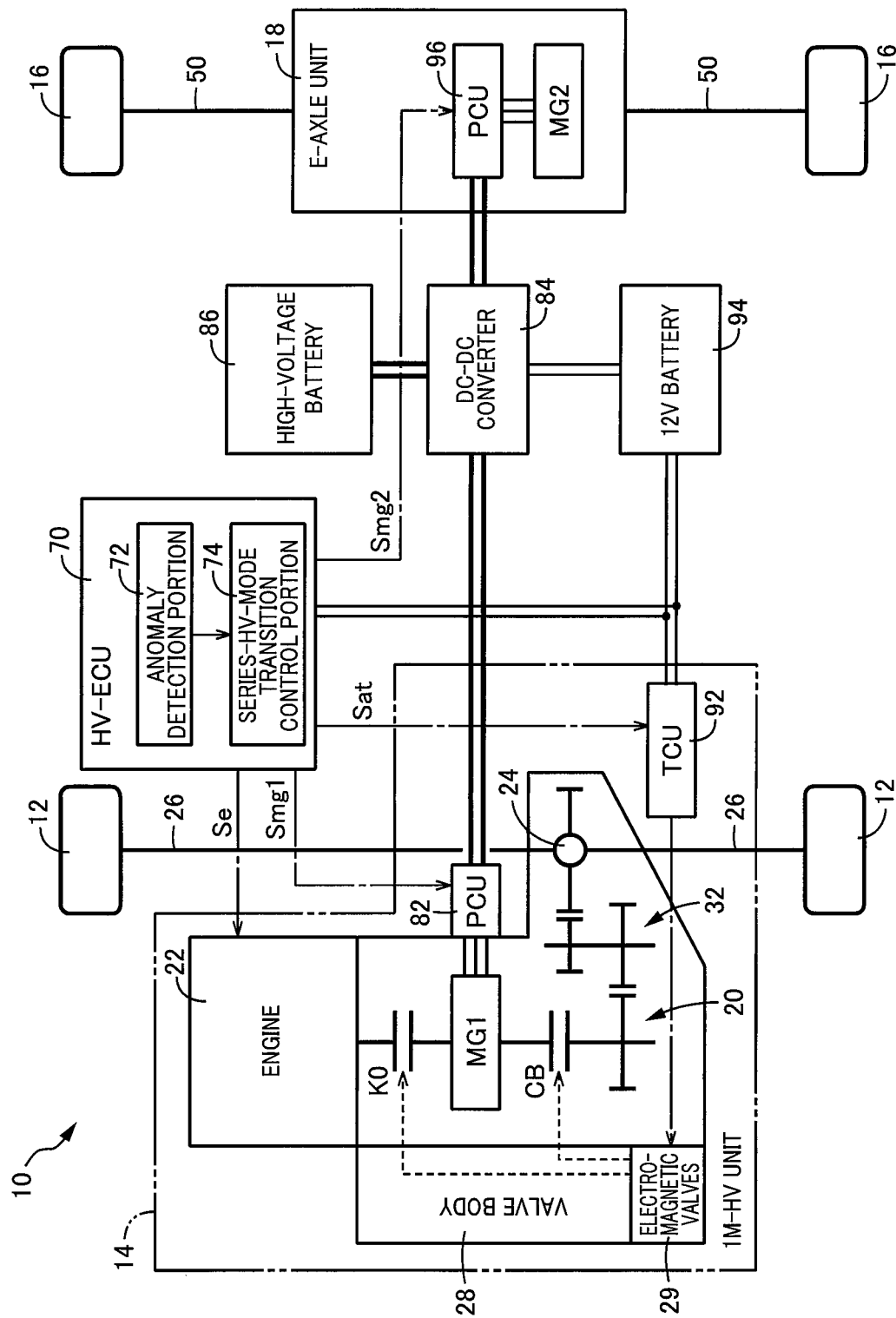
FIG. 1 is a view schematically showing a construction of a drive apparatus for a hybrid vehicle, which is an embodiment of the present invention, and major control functions and control portions of the drive apparatus.

The engine used as a running drive power source is an internal combustion engine such as a gasoline engine and a diesel engine, which is configured to generate a power by combustion of fuel supplied thereto. The first rotating machine is a motor generator that is to be used as a selected one of a running drive power source and a generator. The second rotating machine is to be used at least as a running drive power source, and may be either an electric motor and a motor generator that is to be used as a selected one of an electric motor and a generator. The electric drive unit may be configured to drive right and left wheels of the vehicle by distributing an output of the single second rotating machine through a differential device, to the right and left wheels, for example. However, the electric drive unit may include a pair of second rotating machines that are configured to drive the respective right and left wheels independently of each other. The automatic transmission, which includes the plurality of hydraulically-operated shifting engagement devices, may be a step-variable transmission of planetary gear type or constant-mesh two parallel shaft type, for example, and is disposed in a power transmission path between the first rotating machine and drive wheels. Each of the shifting engagement devices is, for example, a frictional engagement clutch or brake, or a dog clutch. The hydraulically-operated connecting/disconnecting device is also, for example, a frictional engagement clutch or brake, or a dog clutch. A start clutch may be provided in a power transmission path between the first rotating machine and the automatic transmission, as needed, such that the power transmission through the automatic transmission is to be cut off with release of the start clutch.

Each of the electromagnetic valves provided for controlling the engaged/released states of the shifting engagement devices and the engaged/released state of the connecting/disconnecting device is advantageously constituted by a linear solenoid valve capable of continuously changing its output hydraulic pressure. However, each of the electromagnetic valves may be constituted by an ON/OFF solenoid valve, too. A working fluid outputted by the electromagnetic valves may be supplied directly to the respective shifting engagement devices and connecting/disconnecting device so as to engage these shifting engagement devices and connecting/disconnecting device. However, the supply of the working fluid to the shifting engagement devices and connecting/disconnecting device may be made in any one of various manners. For example, switch valves such as control valves may be provided to receive the working fluid outputted from the respective electromagnetic valves so as to be subjected to switch control for thereby supplying the working fluid for engaging the shifting engagement devices and the connecting/disconnecting device. Each of the electromagnetic valves may be either one of a normally-closed electromagnetic valve and a normally-open electromagnetic valve, which is selected depending on a hydraulic circuit, wherein the normally-closed electromagnetic valve is configured to output the working fluid when being energized, and to stop output of the working fluid when being de-energized, and wherein the normally-open electromagnetic valve is configured to stop output of the working fluid when being energized, and to output the working fluid when being de-energized.

The anomaly, which disenables the shift control of the automatic transmission, can be detected based on, for example, a deviation of an actual gear ratio from a theoretical gear ratio of a target gear position of the automatic transmission, a racing or blow-up of an input rotational speed of the automatic transmission, or a difference between an input rotational speed and an output rotational speed of each of the shifting engagement devices. The anomaly disenabling the shift control is, for example, a power OFF failure in which supply of the electric power to all of the electromagnetic valves of the hydraulic control unit is cut off, and is caused due to connector removal or wire disconnection, for example. However, there is a possibility that wire disconnection or the like is caused to cut off the supply of the electric power to one or ones of the electromagnetic valves, or valve stuck is caused to make the electromagnetic valves suffer from mechanical malfunction. That is, the anomaly that disenables the shift control is not necessarily an anomaly disabling an entirety of the shift control but may be an anomaly disabling a part of the shift control. It is preferable that the hydraulic control unit is constructed such that, in event of the power OFF failure, the connecting/disconnecting device is engaged and also the automatic transmission is placed in the power-transmission cut-off state with the plurality of shifting engagement devices being released. When the shift control is disenabled due to stop of the supply of the electric power to one or ones of the electromagnetic valves or valve stuck or the like making the electromagnetic valves suffer from mechanical malfunction, a failure-case switch control may be executed to cause the connecting/disconnecting device to be engaged by an electrical control and to cause the power transmission through the automatic transmission to be cut off by a hydraulic control. For example, in a case in which the hydraulic circuit is constructed such that, in the event of the power OFF failure, the connecting/disconnecting device is engaged and the power transmission through the automatic transmission is cut off, a power-OFF control portion may be provided to forcibly stop the supply of the electric power to all of the electromagnetic valves in the event of the anomaly in which the supply of the electric power to one or ones of the electromagnetic valves is cut off.

Preferred Embodiments

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

FIG. 1 is a schematic view showing a construction of a drive apparatus 10 for a hybrid vehicle, to which the present invention is applied, and showing also major portions of a control system provided to perform various controls in the drive apparatus 10. As shown in FIG. 1, the drive apparatus 10 is a drive apparatus of four-wheel drive system, which includes a 1M-HV (1 motor hybrid) unit 14 for driving and rotating front right and left wheels 12 and an e-axle unit 18 for driving and rotating rear right and left wheels 16. The 1M-HV unit 14 includes: an AT shift portion 20 including a plurality of hydraulically-operated shifting engagement devices CB and configured to establish a plurality of gear positions depending on engaged/released states of the shifting engagement devices CB; a first rotating machine MG1 disposed on an upstream side of the AT shift portion 20; and an engine 22 disposed on an upstream side of the first rotating machine MG1 and connected to the first rotating machine MG1 through a hydraulically-operated connecting/disconnecting device K0 such that the engine 22 is disconnectable from the first rotating machine MG1 that is disposed in a power transmission path between the AT shift portion 20 and the engine 22, wherein the engine 22 and the first rotating machine MG1 are used as running drive power sources. A drive power of the engine 22 and/or a drive power of the first rotating machine MG1, which is transmitted to the AT shift portion 20, is distributed by a differential device 24 into right and left drive shafts 26, and then is transmitted to the front right and left wheels 12 from the respective right and left drive shafts 26. The 1M-HV unit 14 corresponds to a hybrid drive unit configured to drive one of the front and rear wheels.

The engine 22 is an internal combustion engine such as gasoline engine and diesel engine, and an operation state (e.g., engine torque) of the engine 22 is controlled in accordance with an engine-control command signal Se supplied from a hybrid control device in the form of an HV-ECU (electronic control unit) 70. The HV-ECU 70 is connected to a 12V battery 94 that supplies, to the HV-ECU 70, an electric power required to operate the HV-ECU 70. The first rotating machine MG1 is a motor generator that is used as a selected one of an electric motor and a generator, and is connected to a high-voltage battery 86 through a PCU (power control unit) 82 and a DC-DC converter 84. With the PCU 82 being controlled in accordance with an MG1-control command signal Smg1 supplied from the HV-ECU 70, the first rotating machine MG1 is caused to function as the electric motor or the generator, and a torque of the first rotating machine MG1 is controlled. The connecting/disconnecting device K0 is a friction clutch of a single-disc type or a multiple-disc type, and is controlled by a working fluid supplied from a valve body 28, so as to be engaged and released. The valve body 28 is provided with a plurality of electromagnetic valves 29 for executing an engagement/release control of the connecting/disconnecting device K0 and a shift control of the AT shift portion 20, namely, an engagement/release control of each of the shifting engagement devices CB. The electromagnetic valves 29 are connected to the 12V battery 94 through a TCU (transmission control unit) 92. With the TCU 92 being controlled in accordance with a hydraulic-pressure-control command signal Sat supplied from the HV-ECU 70, the engagement/release controls of the connecting/disconnecting device K0 and the shifting engagement devices CB are executed. With the engagement/release controls of the shifting engagement devices CB being executed, the gear position of the AT shift portion 20 is switched.

Figures 2, 3:
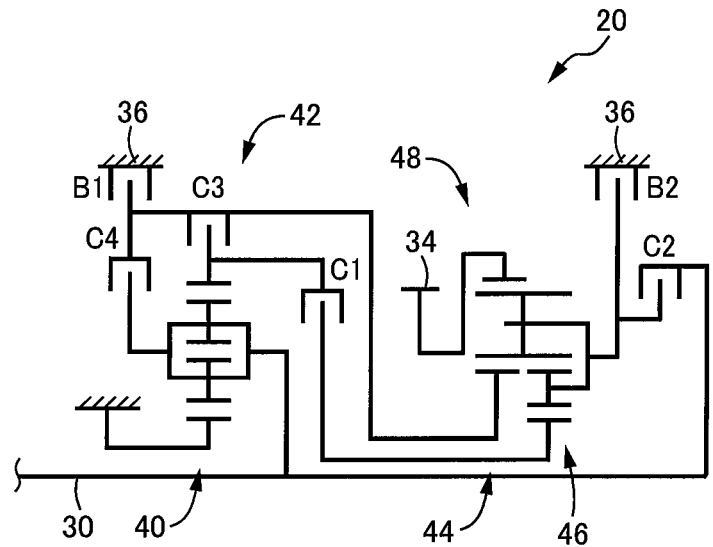
FIG. 2 is a view schematically showing, by way of example, an AT shift portion provided in the drive apparatus of FIG. 1.
FIG. 3 is a table indicating a relationship between each gear position of the AT shift portion of FIG. 2 and a combination of shift engagement devices of the AT shift portion, which are to be placed in their engaged states to establish the gear position in the AT shift portion.

The AT shift portion 20 is a step-variable automatic transmission of planetary gear type or constant-mesh two parallel shaft type. FIG. 2 is a schematic view showing, by way of example, the AT shift portion 20 of the planetary gear type. Since the AT shift portion 20 is constructed to be symmetrical with respect to its axis, its lower half located on a lower side of the axis is not shown in the schematic view of FIG. 2. The AT shift portion 20 includes an input shaft 30 connected to the first rotating machine MG1 and an output gear 34 from which the drive power is to be outputted to the differential device 24 through a reduction gear mechanism 32 (see FIG. 1). The AT shift portion 20 further includes a first shift portion 42 constituted mainly by a first planetary gear device 40 of double pinion type and a second shift portion 48 constituted mainly by a second planetary gear device 44 of single pinion type and a third planetary gear device 46 of double pinion type, such that the first and second shift portions 42, 48 are disposed on a common axis. In the AT shift portion 20, a rotary motion of the input shaft 30 is transmitted to the output gear 34 at a gear ratio provided by a currently established one of the gear positions, and the transmitted rotary motion is outputted from the output gear 34. The second and third planetary gear devise 44, 46 cooperate with each other to constitute Ravigneaux type planetary gear train in which their respective carriers are constituted by a common member, their respective ring gears are constituted by a common member, and pinion gears of the second planetary gear devise 44 serve also as second pinion gears (i.e., outer pinion gears) of the third planetary gear device 46.

The AT shift portion 20 includes hydraulically-operated friction engagement devices in the form of four clutches C1-C4 and two brakes B1, B2, which are to be controlled to be engaged and released by the working fluid supplied thereto from the valve body 28. Each of the brakes B1, B2 is configured to fix a rotary element to a transaxle casing 36 so as to stop rotation of the rotary element. These clutches C1-C4 and brakes B1, B2 correspond to the above-described shifting engagement devices CB, and will be referred to as "shifting engagement devices CB" unless they are to be distinguished from one another. As shown in a table of FIG. 3, each of eight forward running gear positions (consisting of a first-speed gear position "1st", a second-speed gear position "2nd", a third-speed gear position "3rd", a fourth-speed gear position "4th", a fifth-speed gear position "5th", a sixth-speed gear position "6th", a seventh-speed gear position "7th" and an eighth-speed gear position "8th") and two reverse running gear positions (consisting of a first-speed reverse gear position "Rev1" and a second-speed reverse gear position "Rev2") is established in the AT shift portion 20, with corresponding two of the shifting engagement devices CB being engaged. Further, as shown in the table of FIG. 3, with all of the shifting engagement devices CB being released, the AT shift portion 20 establishes a neutral position "N" in which a power transmission through the AT shift portion 20 is cut off. The first-speed gear position "1st" provides the highest gear ratio γ (=rotational speed of input shaft 30/rotational speed of output gear 34), while the eighth-speed gear position "8th" provides the lowest gear ratio γ. As is apparent from FIG. 3, in the AT shift portion 20 according to the present invention, when a shifting action is to be executed between two adjacent front gear positions such as between the second-speed gear position "2nd" and third-speed gear position "3rd", the shifting action is executed by a so-called "clutch-to-clutch" shifting operation with a releasing action of one of the shifting engagement devices CB and an engaging action of another one of the shifting engagement devices CB. Each of the shifting engagement devices CB is constituted by, for example, a wet-type multiple-disc clutch including a plurality of friction plates which are superposed on each other and which are forced against each other by a hydraulic actuator, or a band brake including a rotary drum and one band or two bands which is/are wound on an outer circumferential surface of the rotary drum and tightened at end portion or portions thereof by a hydraulic actuator.

Figure 4:
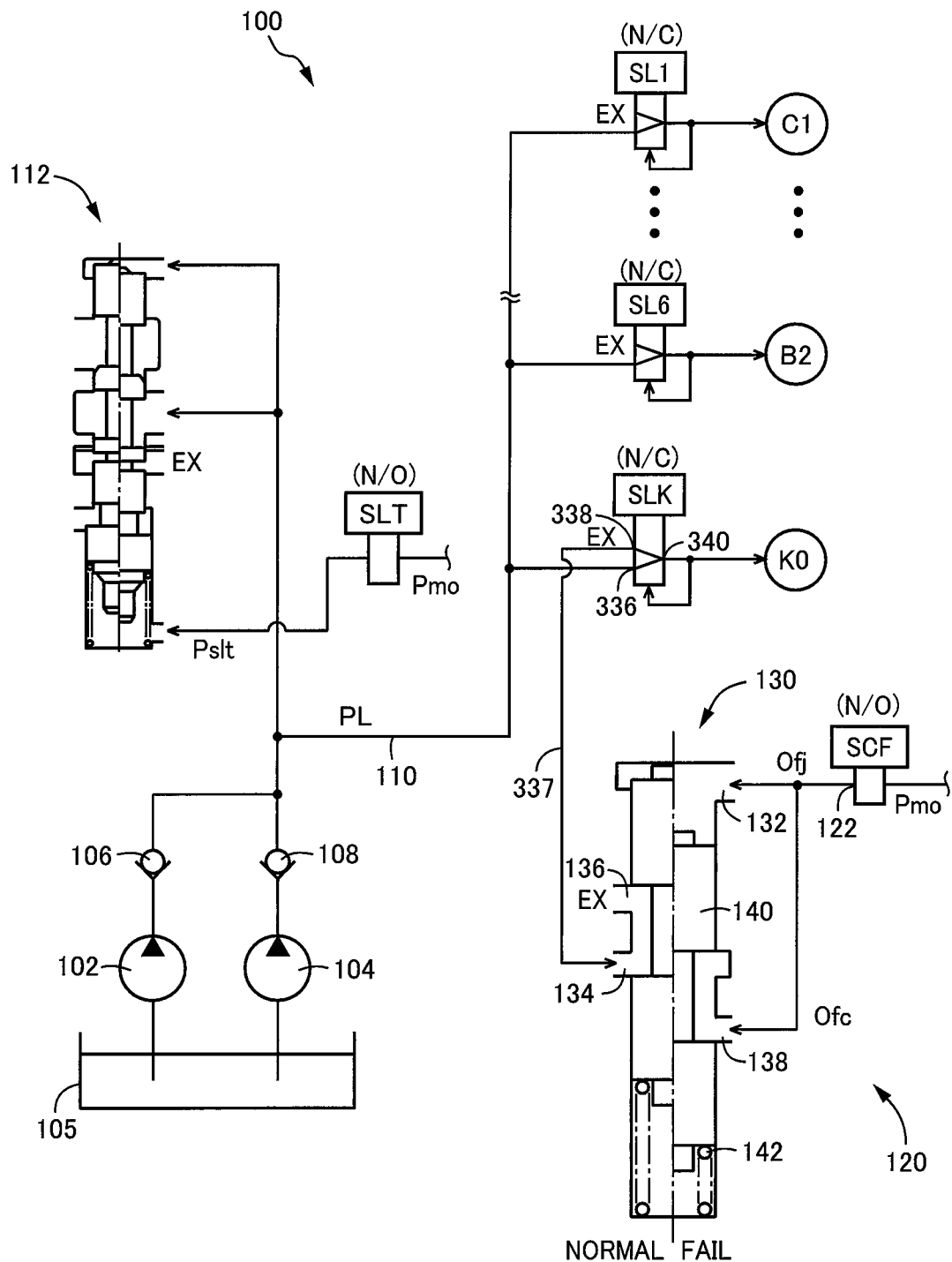
FIG. 4 is a hydraulic circuit diagram for explaining an example of a hydraulic control unit that is involved in a shift control of the AT shift portion of FIG. 2 and an engagement/release control of a connecting/disconnecting device K0.

FIG. 4 is a hydraulic circuit diagram showing, by way of example, a hydraulic control unit (hydraulic control circuit) 100 including linear solenoid valves SL1-SL6, SLK provided for executing the engagement/release controls of the shifting engagement devices CB (including the clutches C1-C4 and the brakes B1, B2) and the engagement/release control of the connecting/disconnecting device K0. The hydraulic control unit 100 is constructed to include the above-described valve body 28, and each of the linear solenoid valves SL1-SL6, SLK is a specific example of the above-described electromagnetic valves 29.

The hydraulic control unit 100 includes hydraulic pressure sources in the form of a mechanical fluid pump (mechanical oil pump) 102 that is to be driven and rotated by the engine 22 and an electric fluid pump (electric oil pump) (EOP) 104 that is to be driven and rotated by a pump motor when the engine 22 is not operated. The electric fluid pump 104 is to be operated in accordance with an EOP operation command of the hydraulic-pressure-control command signal Sat outputted from the HV-ECU 70. The working fluid, which has been pumped up by these fluid pumps 102, 104 from a fluid storage portion 105 such as an oil pan, is supplied through check valves 106, 108 to a line-pressure fluid passage 110, and is regulated to a predetermined line pressure PL by a line-pressure control valve 112 such as a primary regulator valve. A linear solenoid valve SLT, which is connected to the line-pressure control valve 112, receives an original pressure in the form of a modulator fluid pressure Pmo that is a substantially constant pressure, and is electrically controlled through the TCU 92 in accordance with the hydraulic-pressure-control command signal Sat supplied from the HV-ECU 70, so as to output a signal pressure Pslt. With the signal pressure Pslt being supplied to the line-pressure control valve 112, a spool of the line-pressure control valve 112 is forced by the signal pressure Pslt to be moved in an axial direction whereby a drain flow rate is changed, so that the line pressure PL is regulated depending on the signal pressure Pslt. The line pressure PL is regulated depending on, for example, a requested drive-power amount such as an accelerator opening degree (accelerator operation degree) θacc.

The linear solenoid valve SLT is a normally-open (N/O) solenoid valve that is configured, when being de-energized, for example, in event of a power OFF failure due to connector removal or the like, to output the modulator fluid pressure Pmo (without substantial change of the pressure value) as the signal pressure Pslt, so that the line pressure PL of a high pressure value is outputted from the line-pressure control valve 112. Further, in event of an anomaly (ON failure) in which the signal pressure Pslt is held at a minimum pressure value, for example, due to valve stuck in which the spool of the linear solenoid valve SLT is made unmovable by biting of foreign substances or the like, the spool of the line-pressure control valve 112 is held in vicinity of its lower stroke end as seen in FIG. 4, a predetermined minimum line pressure PLmin as the line pressure PL is outputted from the line-pressure control valve 112.

The working fluid, which is regulated to the line pressure PL, is supplied through the line-pressure fluid passage 110, for example, to the linear solenoid valves SL1-SL6 for the shift control of the AT shift portion 20 and to the linear solenoid valve SLK for the engagement/release control of the connecting/disconnecting device K0. The linear solenoid valves SL1-SL6 are provided for hydraulic actuators (hydraulic cylinders) of the respective clutches C1-C4 and brakes B1, B2, and their respective output hydraulic pressures (engagement hydraulic pressures) are controlled through the TCU 92 in accordance with the hydraulic-pressure-control command signal Sat supplied from the HV-ECU 70. The working fluid outputted from the linear solenoid valves SL1-SL6 is supplied directly to the clutches C1-C4 and brakes B1, B2, and the engagement/release controls of the clutches C1-C4 and brakes B1, B2 are executed independently of one another. Although parts of the hydraulic circuit relating to the clutches C2-C4 and brake B1 are not shown in FIG. 4, the clutches C2-C4 and brake B1 have substantially the same construction as the clutch C1 and brake B2. The linear solenoid valve SLK is provided to correspond to the hydraulic actuator (hydraulic cylinder) of the connecting/disconnecting device K0, and its output hydraulic pressure (engagement hydraulic pressure) is controlled through the TCU 92 in accordance with the hydraulic-pressure-control command signal Sat supplied from the HV-ECU 70. The working fluid outputted from the linear solenoid valve SLK is supplied directly to the connecting/disconnecting device K0, and the engagement/release control of the connecting/disconnecting device K0 is executed. Each of the linear solenoid valves SL1-SL6, SLK is a normally-closed (N/C) solenoid valve which is configured, when being energized, to output the working fluid of a certain hydraulic pressure so as to engage the clutches C1-C4, brakes B, B2 and connecting/disconnecting device K0, and which is configured, when being de-energized, for example, in event of the power OFF failure due to connector removal or the like, to stop outputting the working fluid so as to release the clutches C1-C4, brakes B, B2 and connecting/disconnecting device K0. With all of the clutches C1-C4 and brakes B, B2 being released, the AT shift portion 20 establishes the neutral position "N" in which the power transmission through the AT shift portion 20 is cut off.

Figure 5:
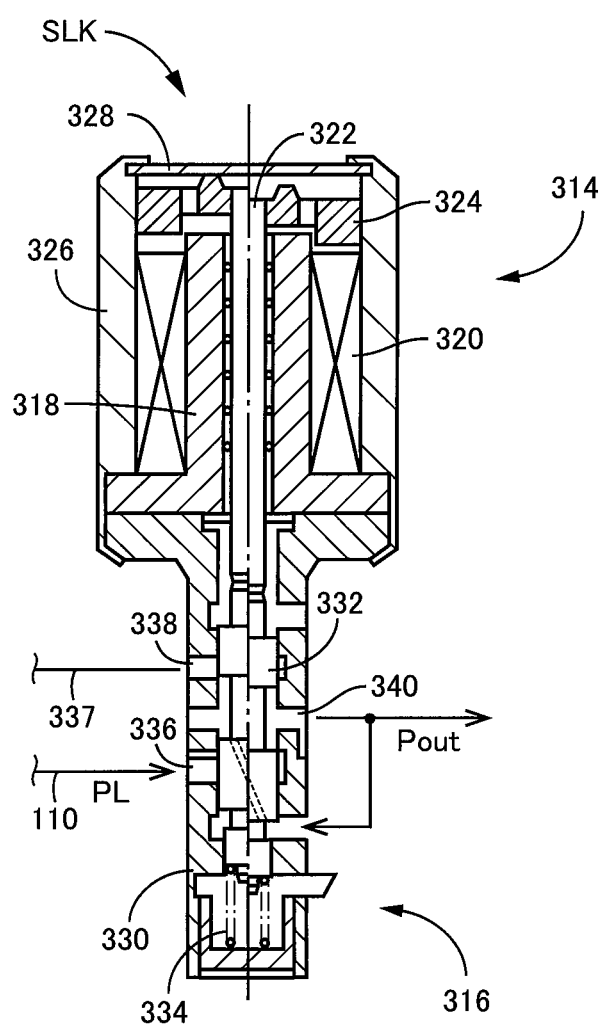
FIG. 5 is a cross sectional view for specifically explaining an example of a linear solenoid valve SLK shown in FIG. 4.

FIG. 5 is a cross sectional view for specifically explaining an example of the linear solenoid valve SLK. The linear solenoid valve SLK includes a solenoid portion 314 that is a device configured, when being energized, to covert an electric energy into a drive force, and a regulator portion 316 that is configured, when being driven by the solenoid portion 314, to regulate the line pressure PL as an input pressure so as to generate a predetermined output hydraulic pressure Pout. The regulator portion 316 is provided with an input port 336 to which the line-pressure fluid passage 110 is connected, a drain port 338 to which a discharge fluid passage 337 is connected for discharging the working fluid of the connecting/disconnecting device K0, and an output port 340 which is connected to the hydraulic actuator of the connecting/disconnecting device K0. The solenoid portion 314 includes a cylindrical-tubular-shaped winding core 318, a coil 320 constituted by a conductor cable wound on a periphery of the winding core 318, a core 322 provided to be axially movable inside the winding core 318, a plunger 324 fixed to one of axially opposite end portions of the core 322 which is remote from the regulator portion 316, a casing 326 storing therein the winding core 318, coil 320, core 322 and plunger 324, and a cover 328 fitted in an opening of the casing 326. The regulator portion 316 includes a sleeve 330 fitted in the casing 326, a spool 332 provided to be axially movable inside the sleeve 330, and a spring 134 constantly forces or biases the spool 332 toward the solenoid portion 314. The spool 332 is in contact, at one of axially opposite end portions which is on a side of the solenoid portion 314, with the other of the above-described axially opposite end portions of the core 322, namely, with one of the above-described axially opposite end portions of the core 322, which is on a side of the regulator portion 316.

In the linear solenoid valve SLK constructed as described above, with a drive current Idr being applied to the coil 320, the plunger 324 is moved by a distance that is dependent on a value of the applied drive current Idr, in an axial direction (downward direction as seen in FIG. 5) of the plunger 324, core 322 and spool 332 that are coaxial with one another, and the core 322 and the spool 332 are moved together with the plunger 324 in the same axial direction. With the axial movement of the spool 332, a rate of flow of the working fluid introduced through the input port 336 and a rate of flow of the working fluid discharged through the drain port 338 are adjusted, so that the line pressure PL inputted through the input port 336 is regulated to the output hydraulic pressure Pout corresponding to the drive current Idr in accordance with an output hydraulic-pressure characteristic as represented by solid line in FIG. 6 by way of example. The output hydraulic pressure Psl is outputted through the output port 340. In FIG. 5, a right half of the spool 332 represents a state in which the line pressure PL is regulated to the output hydraulic pressure Pout. On the other hand, when the linear solenoid valve SLK is de-energized, for example, in event of the power OFF failure due to connector removal or the like, the spool 332 is moved by the biasing force of the spring 334 upward direction (as seen FIG. 5), i.e., toward the solenoid portion 314, so as to be positioned in a drain position, whereby the communication between the input port 336 and the output port 340 is isolated and the drain port 338 and the output port 340 are brought into communication with each other, so that the working fluid in the connecting/disconnecting device K0 is cause to flow from the output port 340 to the drain port 338. In this instance, the connecting/disconnecting device K0 would be necessarily released if the hydraulic control unit 100 is not provided with a failure-case connection unit (failure-case connection circuit) 120 described below. Each of the linear solenoid valves SL1-SL6 for the shift control of the AT shift portion 20 has substantially the same construction as the linear solenoid valve SLK.

Figure 6:
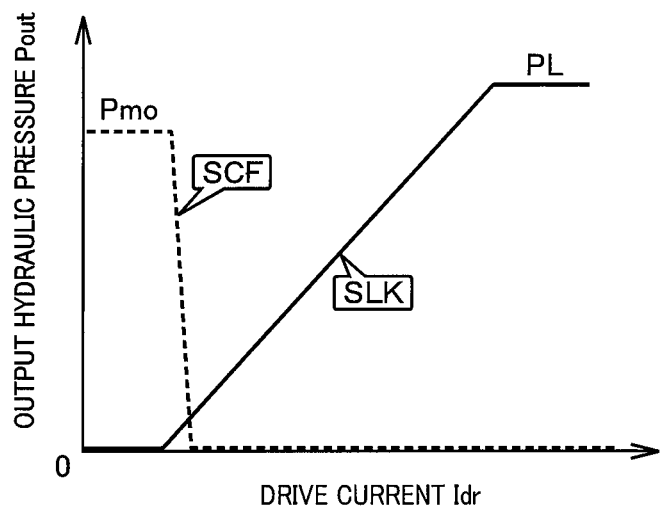
FIG. 6 is a view showing, by way of example, an output hydraulic-pressure characteristic of each of the linear solenoid valve SLK and a failure-determination electromagnetic valve SCF that are shown in FIG. 4.

Referring back to FIG. 4, the hydraulic control unit 100 further includes the failure-case connection unit 120 for engaging the connecting/disconnecting device K0, in event of TCU failure that disables controls of the electromagnetic valves 29 by the TCU 92 and accordingly disables the shift control of the automatic transmission 20, specifically, for example, in event of the power OFF failure due to connector removal or wire disconnection. The failure-case connection unit 120 includes a failure-determination electromagnetic valve SCF and a fail-safe valve 130. The failure-determination electromagnetic valve SCF is a normally-open (N/O) ON/OFF solenoid valve which is placed in its closed state with supply of the electric power thereto so as to stop the output of the modulator fluid pressure Pmo, and which is placed in its open state so as to output the working fluid of the modulator fluid pressure Pmo as the failure determination fluid Ofj from the output port 122 when being de-energized, for example, in event of the power OFF failure due to connector removal or the like. In FIG. 6, broken line represents an example of an output hydraulic-pressure characteristic of the failure-determination electromagnetic valve SCF.

The fail-safe valve 130 includes a switch port 132 to which the failure determination fluid Ofj is to be supplied from the failure-determination electromagnetic valve SCF, a connection port 134 to which the discharge fluid passage 337 is connected for releasing the connecting/disconnecting device K0, a drain port 136 for draining the working fluid supplied from the discharge fluid passage 337 to the connection port 134, and an engagement port 138 to which a failure-case engagement fluid Ofc is to be supplied for engaging the connecting/disconnecting device K0. In the present embodiment, the failure determination fluid Ofj as the failure-case engagement fluid Ofc is supplied from the failure-determination electromagnetic valve SCF to the engagement port 138. The fail-safe valve 130 includes a spool 140 movable in an axial direction (i.e., vertical direction as seen in FIG. 4). With movement of the spool 140 in the axial direction, the fail-safe valve 130 is switchable between two states, i.e., a normal-case connection state and a failure-case connection state. When the fail-safe valve 130 is placed in the normal-case connection state, the connection port 134 and the drain port 136 are in communication with each other, and communication between the connection port 134 and the engagement port 138 is cut off, so that the working fluid supplied from the discharge fluid passage 337 to the connection port 134 is drained through the drain port 136. When the fail-safe valve 130 is placed in the failure-case connection state, the connection port 134 and the engagement port 138 are in communication with each other, and communication between the connection port 134 and the drain port 136 is cut off, so that the failure-case engagement fluid Ofc is outputted to the discharge fluid passage 337. In FIG. 4, a left half of the spool 140 represents the normal-case connection state of the fail-safe valve 130, while a right half of the spool 140 represents the failure-case connection state of the fail-safe valve 130.

The spool 140 of the fail-safe valve 130 is normally held in a normal-side position (i.e., an upper-side position as seen in FIG. 4) by the biasing force of the spring 142, as represented by the left half of the spool 140, so that the fail-safe valve 130 is placed in the normal-case connection state. On the other hand, when the failure determination fluid Ofj is supplied to the switch port 132 from the failure-determination electromagnetic valve SCF, the spool 140 is moved to a failure-side position (i.e., a lower-side position as seen in FIG. 4) against the biasing force of the spring 142, so that the fail-safe valve 130 is switched to the failure-case connection state. That is, in a normal case in which the drive current is appropriately supplied from the TCU 92 to each of the electromagnetic valves 29 of the hydraulic control unit 100, the failure-determination electromagnetic valve SCF is placed in its closed state whereby the fail-safe valve 130 is held in the normal-case connection state in which the working fluid from the linear solenoid valve SLK is allowed to be drained whereby the engagement/release control of the connecting/disconnecting device K0 by the linear solenoid valve SLK is allowed. On the other hand, in event of the TCU failure such as the power OFF failure in which supply of the drive current from the TCU 92 to all of the electromagnetic valves 29 of the hydraulic control unit 100 is cut off, the failure determination fluid Ofj is outputted from the failure-determination electromagnetic valve SCF whereby the fail-safe valve 130 is placed in the failure-case connection state. Thus, even in a state in which the hydraulic actuator of the connecting/disconnecting device K0 is connected to the discharge fluid passage 337, with the spool 332 of the linear solenoid valve SLK being positioned in the drain position due to the power OFF failure (see FIG. 5), the failure-case engagement fluid Ofc is supplied to the discharge fluid passage 337 from the fail-safe valve 130, so that the failure-case engagement fluid Ofc is supplied to the hydraulic actuator of the connecting/disconnecting device K0 through the linear solenoid valve SLK whereby the connecting/disconnecting device K0 is engaged.

Referring back to FIG. 1, the e-axle unit 18 includes a second rotating machine MG2, and is configured to drive the rear right and left wheels 16, with the second rotating machine MG2 being used as a running drive power source. The second rotating machine MG2 is a motor generator that is used as a selected one of an electric motor and a generator, and is connected to the high-voltage battery 86 through a PCU (power control unit) 96 and the DC-DC converter 84. With the PCU 96 being controlled in accordance with an MG2-control command signal Smg2 supplied from the HV-ECU 70, the second rotating machine MG2 is caused to function as the electric motor or the generator. The e-axle unit 18 is configured to drive the rear right and left wheels 16, for example, by distributing a drive power outputted from the second rotating machine MG2 into right and left drive shafts 50 through a differential device (not shown). The e-axle unit 18 corresponds to an electric drive unit configured to drive the other of the front and rear wheels.

The HV-ECU 70 includes, for example, a so-called microcomputer incorporating a CPU, a ROM, a RAM and an input-output interface. The CPU performs various controls of the drive apparatus 10, by processing various input signals, according to control programs stored in the ROM, while utilizing a temporary data storage function of the RAM. The HV-ECU 70 or the CPU performs, for example, output controls of the engine 22, first and second rotating machines MG1, MG2, shift control of the AT shift portion 20 and engagement/release control (connection/disconnection control) of the connecting/disconnecting device K0, and may be constituted by two or more control units exclusively assigned to perform different controls such as engine control and transmission shifting control, as needed. The HV-ECU 70 is capable of establishing various drive modes such as a two-wheel drive mode in which the vehicle runs with only the front wheels 12 being driven by only the 1M-HV unit 14, a four-wheel drive mode in which the vehicle runs with the front and rear wheels 12, 16 being driven by both of the 1M-HV unit 14 and the e-axle unit 18, an engine drive mode in which the vehicle runs with only the front wheels 12 being driven by only the engine 22 of the 1M-HV unit 14, and an EV drive mode in which the vehicle runs with only the front wheels 12 being driven by only the first rotating machine MG1 of the 1M-HV unit 14. Thus, the vehicle can run in a selected one of these various drive modes, which is selected depending on, for example, driving condition or selection operation made by a driver of the vehicle. The output controls of the engine 22 and the first and second rotating machines MG1, MG2 are executed basically depending on the requested drive-power amount such as the accelerator opening degree θacc. Further, in the shift control of the AT shift portion 20, a target gear position is obtained in accordance with, for example, a shift map defined by parameters in the form of a vehicle running speed V and the requested drive-power amount (e.g., accelerator opening degree θacc), or a shift operation manually made by the vehicle driver, and the hydraulic-pressure-control command signal Sat is outputted to cause the AT shift portion 20 to establish the target gear position.

The HV-ECU 70 further functionally includes an anomaly detection portion 72 and a series-HV-mode transition control portion 74. The anomaly detection portion 72 is configured to detect or determine whether the TCU failure occurs or not, namely, whether an anomaly that disables the shift control of the AT shift portion 20 occurs or not, for example, based on a deviation of an actual gear ratio γ from a theoretical gear ratio γ0 of the target gear position of the AT shift portion 20. The TCU failure is the power OFF failure in which supply of the electric power to all of the plurality of electromagnetic valves 29 (such as the linear solenoid valves SL1-SL6, SLK) of the hydraulic control unit 100 is cut off, due to connector removal, wire disconnection or the like. In event of the TCU failure, i.e., the power OFF failure, all of the shifting engagement devices CB (including the clutches C1-C4 and brakes B1, B2) are released whereby the AT shift portion 20 is placed in the power-transmission cut-off state, while the connecting/disconnecting device K0 is placed in its connection state with the failure-case engagement fluid Ofc being supplied to the discharge fluid passage 337 by the failure-case connection unit 120. That is, the engine 22 and the first rotating machine MG1 are brought into connection with each other through the connecting/disconnecting device K0, while the AT shift portion 20 whose shift control is disabled is placed in the power-transmission cut-off state whereby the power transmission to the front wheels 12 is cut off.

Meanwhile, when it is detected or determined by the anomaly detection portion 72 that the TCU failure occurs, the series-HV-mode transition control portion 74 causes the engine 22 to be operated so as to drive and rotate the first rotating machine MG1, and executes a regenerative control of the first rotating machine MG1 so as to generate an electric power, for thereby making a transition to a series HV mode in which the second rotating machine MG2 of the e-axle unit 18 is operated with use of the electric power generated by the regenerative control of the first rotating machine MG1. Owing to this control arrangement, even in the event of the TCU failure that disables the shift control of the AT shift portion 20, the second rotating machine MG2 is operated depending on the requested drive-power amount such as the accelerator opening degree θacc in a series hybrid drive system whereby an evacuation running of the vehicle can be performed with the rear wheels 16 being driven and rotated.

Figure 7:
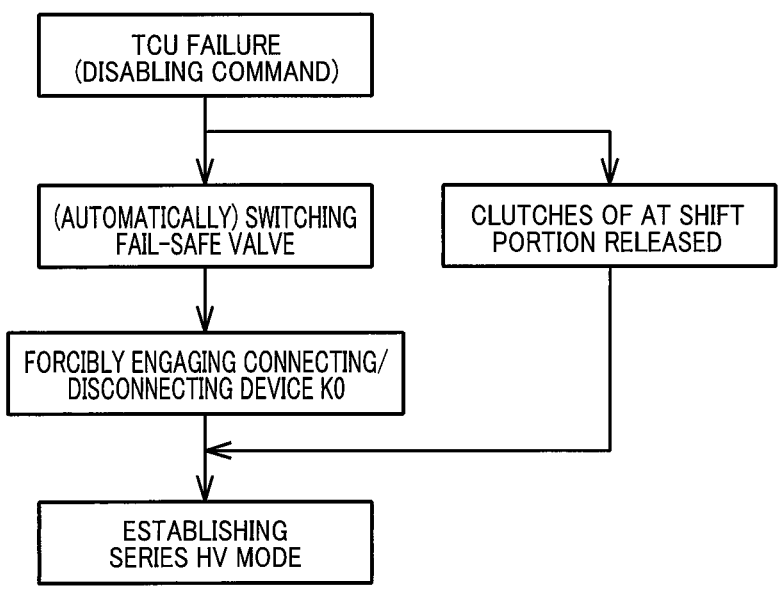
FIG. 7 is a flow chart for explaining an operation of each portion in event of failure of a TCU in the drive apparatus shown in FIG. 1.

FIG. 7 is a flow chart for explaining an operation of each portion of the drive apparatus 10 in the event of the TCU failure. As shown in the flow chart of FIG. 7, when the power OFF failure as the TCU failure occurs, the fail-safe valve 130 is switched to the failure-case connection state whereby the connecting/disconnecting device K0 is forcibly engaged, while all of the shifting engagement devices CB of the AT shift portion 20 are released whereby the AT shift portion 20 is placed in the power-transmission cut-off state. Further, when the TCU failure is detected by the anomaly detection portion 72, the series-HV-mode transition control portion 74 causes the drive apparatus 10 to make a transition to the series HV mode, namely, the series-HV-mode transition control portion 74 causes the drive apparatus 10 to establish the series HV mode. In the series HV mode, the first rotating machine MG1 is driven and rotated by the engine 22 so as to generate the electric power, and the second rotating machine MG2 of the e-axle unit 18 is operated with use of the generated electric power, so that the evacuation running of the vehicle can be performed with the rear wheels 16 being driven and rotated, in accordance with the requested drive-power amount such as the accelerator opening degree θacc.

As described above, in the drive apparatus 10 according to the present embodiment, in the event of the TCU failure that disenables the shift control of the AT shift portion 20, the electric power is generated by causing the first rotating machine MG1 to be rotated by the engine 22, and the hybrid vehicle is driven to run by causing the second rotating machine MG2 of the e-axle unit 18 to be operated with use of the generated electric power, in a state in which the power transmission through the AT shift portion 20 is cut off and the connecting/disconnecting device K0 is engaged. That is, the evacuation running of the vehicle is performed in the series hybrid drive system, so that a running performance of the vehicle such as a starting performance, an uphill climbing performance and a maximum running speed can be improved as a whole, as compared with a conventional drive apparatus by which the evacuation running is performed with the AT shift portion 20 being placed in a certain gear position as a fail-safe gear position.

Further, the hydraulic control unit 100 is provided with the failure-case connection unit 120 including the fail-safe valve 130 and the failure-determination electromagnetic valve SCF that is configured to switch the output state of the failure determination fluid Ofj in the event of the power OFF failure. When the output state of the failure determination fluid Ofj is switched as a result of occurrence of the power OFF failure, the fail-safe valve 130 is placed in the failure-case connection state in which the connection port 134 and the engagement port 138 are brought into communication with each other whereby the failure-case engagement fluid Ofc is supplied to the discharge fluid passage 337 so as to cause the connecting/disconnecting device K0 to be engaged by the failure-case engagement fluid Ofc. That is, in the event of the anomaly that disables the shift control by the power OFF failure by which the supply of the electric power to all of the electromagnetic valves 29 is cut off, the connecting/disconnecting device K0 is automatically placed in its connection state as a result of occurrence of the power OFF failure, it is possible to drive and rotate the first rotating machine MG1 by the engine 22 through the connecting/disconnecting device K0 so as to generate the electric power, even without an additional control being required, so that the evacuation running of the vehicle can be more appropriately performed in the series hybrid drive system.

Further, the failure-determination electromagnetic valve SCF is the normally-open electromagnetic valve that is configured to output the failure determination fluid Ofj in the event of the power OFF failure, and the fail-safe valve 130 is switched from the normal-case connection state to the failure-case connection state by the output of the failure determination fluid Ofj, so that the connecting/disconnecting device K0 is appropriately placed in its connection state as a result of occurrence of the power OFF failure. Further, the hydraulic control unit 100 can be made simple in construction, since the failure determination fluid Ofj is supplied as the failure-case engagement fluid Ofc to the engagement port 138 of the fail-safe valve 130.

Further, the electromagnetic valves 29 are provided for the respective shifting engagement devices CB (including the clutches C1-C4 and the brakes B1, B2), such that each of the shifting engagement devices CB is engaged with a corresponding one of the electromagnetic valves 29 being energized, and is released with the corresponding one of the electromagnetic valves 29 being de-energized. Therefore, in the event of the TCU failure due to the power OFF failure, all of the shifting engagement devices CB are released whereby the AT shift portion 20 is placed in the power-transmission cut-off state. Thus, the evacuation running of the vehicle can be appropriately performed in the series hybrid drive system in which the first rotating machine MG1 is driven and rotated by the engine 22 so as to generate the electric power and the second rotating machine MG2 is operated by the generated electric power.

There will be described other embodiments of the present invention. The same reference signs as used in the above-described embodiment will be used in the following embodiments, to identify the functionally corresponding elements, and descriptions thereof are not provided.

Figure 8:
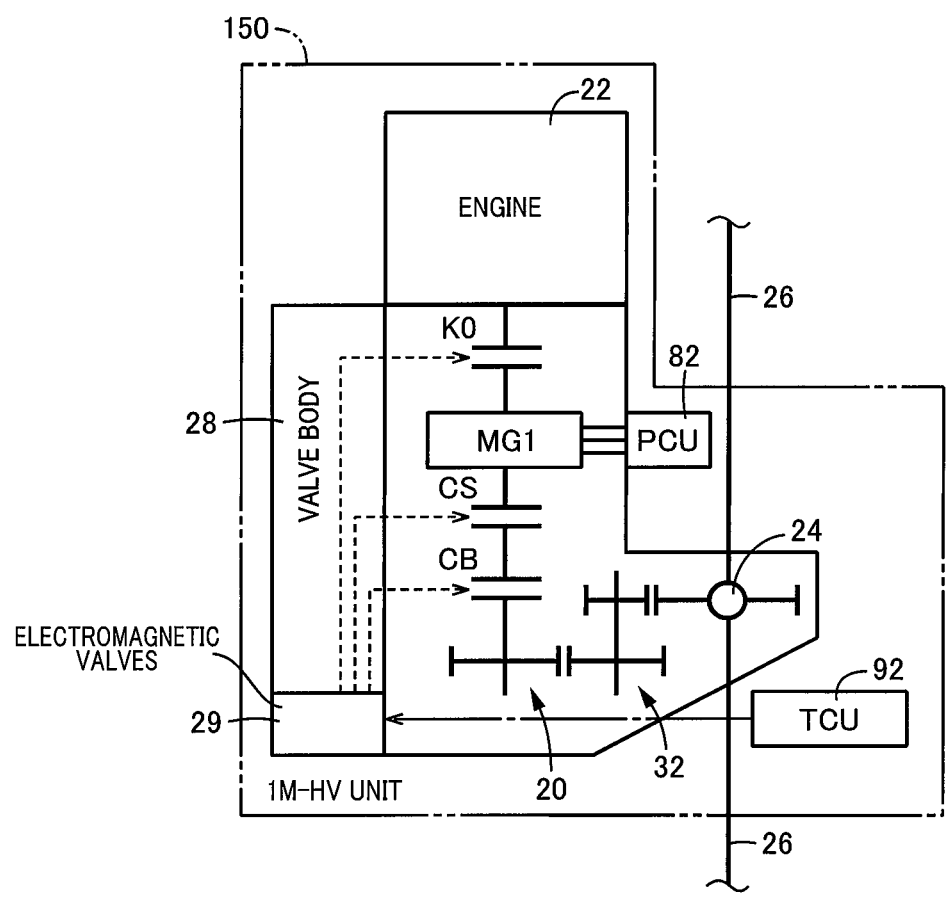
FIG. 8 is a view for explaining another embodiment of the present invention, by schematically showing another example of a 1M-HV unit.

FIG. 8 shows a 1M-HV unit 150 that is different form the 1M-HV unit 14 of the above-described embodiment in that a start clutch CS is provided in a power transmission path between the first rotating machine MG1 and the AT shift portion 20. In this embodiment, too, in the event of the TCU failure due to the power OFF failure, the series HV mode is established in a state in which the connecting/disconnecting device K0 is engaged with the power transmission through the AT shift portion 20 being cut off, and the vehicle can perform the evacuation running in the series HV mode, so that substantially the same effects can be obtained as in the above-described embodiment. In this embodiment, the power transmission through the AT shift portion 20 can be cut off by releasing the start clutch CS, even without the AT shift portion 20 being placed in the power-transmission cut-off state. That is, the start clutch CS may be released in the event of the TCU failure that is an anomaly that disables the shift control of the AT shift portion 20.

Figure 9:
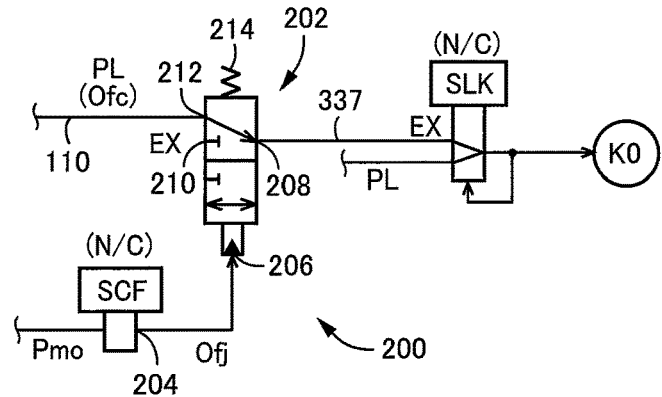
FIG. 9 is a hydraulic circuit diagram for explaining another example of a failure-case connection unit for engaging the connecting/disconnecting device K0 in the event of the failure of the TCU.

FIG. 9 shows a failure-case connection unit 200 that is provided, in place of the above-described failure-case connection unit 120, to engage the connecting/disconnecting device K0 in the event of the power OFF failure. The failure-case connection unit 200 includes a failure-determination electromagnetic valve SCF and a fail-safe valve 202. The failure-determination electromagnetic valve SCF is a normally-close (N/C) ON/OFF solenoid valve which is placed in its open state with supply of the electric power thereto so as to output the working fluid of the modulator fluid pressure Pmo from an output port 204, and which is placed in its closed state so as to stop the output of the failure determination fluid Ofj when being de-energized, for example, in event of the power OFF failure due to connector removal or the like. The fail-safe valve 202 includes a switch port 206 to which the failure determination fluid Ofj is to be supplied from the failure-determination electromagnetic valve SCF, a connection port 208 to which the discharge fluid passage 337 is connected, a drain port 210 for draining the working fluid supplied from the discharge fluid passage 337 to the connection port 208, and an engagement port 212 to which the failure-case engagement fluid Ofc is to be supplied for engaging the connecting/disconnecting device K0. In this embodiment, the line-pressure fluid passage 110 is connected to the engagement port 212 so as to supply the working fluid of the line pressure PL as the failure-case engagement fluid Ofc to the engagement port 212. With movement of a spool (not shown) in the axial direction, the fail-safe valve 202 is switchable between two states, i.e., a normal-case connection state and a failure-case connection state. When the fail-safe valve 202 is placed in the normal-case connection state, the connection port 208 and the drain port 210 are in communication with each other, and communication between the connection port 208 and the engagement port 212 is cut off, so that the working fluid supplied from the discharge fluid passage 337 to the connection port 208 is drained through the drain port 210. When the fail-safe valve 202 is placed in the failure-case connection state, the connection port 208 and the engagement port 212 are in communication with each other, and communication between the connection port 208 and the drain port 210 is cut off, so that the failure-case engagement fluid Ofc is outputted to the discharge fluid passage 337. It is noted that FIG. 9 shows a case in which the fail-safe valve 202 is placed in the failure-case connection state. That is, an upper portion of the fail-safe valve 202 represents the failure-case connection state, while a lower portion of the fail-safe valve 202 represents the normal-case connection state.

The fail-safe valve 202 is placed in the failure-case connection state (as shown in FIG. 9) with the spool being held in a position by a biasing force of a spring 214. In a normal case, when the failure determination fluid Ofj is supplied from the failure-determination electromagnetic valve SCF to the witch port 206, the spool is moved upwardly away from the position (as shown in FIG. 9) against the biasing force of the spring 214 whereby the fail-safe valve 202 is placed in the normal-case connection state. That is, in the normal case in which the drive current is appropriately supplied from the TCU 92 to each of the electromagnetic valves 29 of the hydraulic control unit 100, the failure determination fluid Ofj is outputted from the failure-determination electromagnetic valve SCF whereby the fail-safe valve 202 is held in the normal-case connection state so that the engagement/release control of the connecting/disconnecting device K0 by the linear solenoid valve SLK is allowed. On the other hand, in event of the power OFF failure in which supply of the drive current from the TCU 92 to all of the electromagnetic valves 29 of the hydraulic control unit 100 is cut off, the output of the failure determination fluid Ofj from the failure-determination electromagnetic valve SCF is stopped whereby the fail-safe valve 202 is placed in the failure-case connection state as shown in FIG. 9. Thus, even in a state in which the hydraulic actuator of the connecting/disconnecting device K0 is connected to the discharge fluid passage 337, with the spool 332 of the linear solenoid valve SLK being positioned in the drain position due to the power OFF failure, the failure-case engagement fluid Ofc is supplied to the discharge fluid passage 337 from the fail-safe valve 202, so that the failure-case engagement fluid Ofc is supplied to the hydraulic actuator of the connecting/disconnecting device K0 through the linear solenoid valve SLK whereby the connecting/disconnecting device K0 is engaged.

In the present embodiment, too, in the event of the TCU failure in which the shift control is disenabled by the power OFF failure, the connecting/disconnecting device K0 is automatically placed in its connection state as a result of occurrence of the power OFF failure, it is possible to drive and rotate the first rotating machine MG1 by the engine 22 through the connecting/disconnecting device K0 so as to generate an electric power, even without an additional control being required, so that the evacuation running of the vehicle can be more appropriately performed by the series HV mode.

Figure 10:
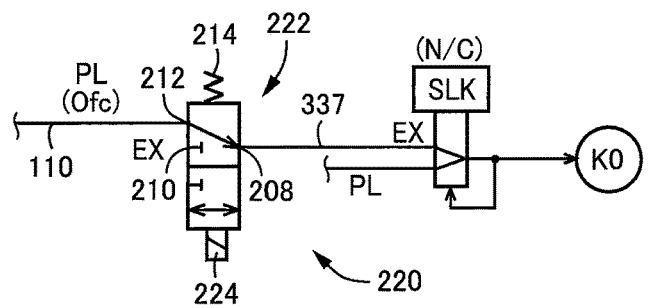
FIG. 10 is a hydraulic circuit diagram for explaining still another example of the failure-case connection unit for engaging the connecting/disconnecting device K0 in the event of the failure of the TCU.

FIG. 10 shows a failure-case connection unit 220 that is different from the failure-case connection unit 200 of FIG. 9 in that the failure-determination electromagnetic valve SCF is not provided, and the connecting/disconnecting device K0 is engaged, in the event of the power OFF failure, with use of a 2-position switching electromagnetic valve 222 including a solenoid 224. The 2-position switching electromagnetic valve 222, which is a modification of the above-described fail-safe valve 202 that is also a 2-position switching valve, is switchable between the normal-case connection state and the failure-case connection state, depending on an operation of the solenoid 224. In the normal case in which the drive current is appropriately supplied to the electromagnetic valves 29 of the hydraulic control unit 100 from the TCU 92, the solenoid 224 is energized whereby the 2-position switching electromagnetic valve 222 is held in the normal-case connection state, so that the engagement/release control of the connecting/disconnecting device K0 by the linear solenoid valve SLK is allowed. On the other hand, in event of the power OFF failure in which supply of the drive current from the TCU 92 to all of the electromagnetic valves 29 of the hydraulic control unit 100 is cut off, the solenoid 224 is de-energized whereby the 2-position switching electromagnetic valve 222 is placed in the failure-case connection state by the spring 214, as shown in FIG. 10, so that the failure-case engagement fluid Ofc is outputted to the discharge fluid passage 337 so as to engage the connecting/disconnecting device K0. Thus, in the present embodiment, too, substantially the same effects can be obtained as in the above-described embodiment shown in FIG. 9. In the present embodiment, the 2-position switching electromagnetic valve 222 can be regarded to have the functions of both of the failure-determination electromagnetic valve SCF and the fail-safe valve 202 that are shown in FIG. 9.

Figure 11:
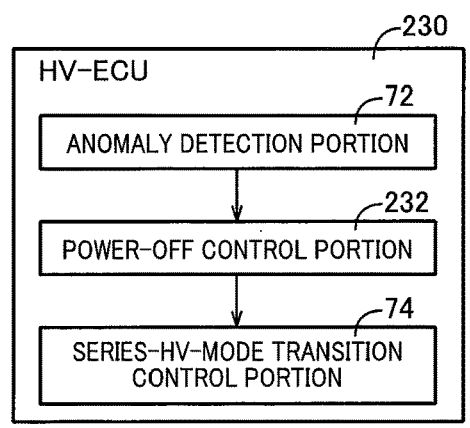
FIG. 11 is a view for explaining still another embodiment, and is a functional block diagram showing an HV-ECU.

FIG. 11 shows an HV-ECU 230 that is different from the above-described HV-ECU 70 in that the HV-ECU 230 functionally includes a power-OFF control portion 232. In event of the TCU failure as the anomaly that disables the shift control, there could be a case in which, in place of the power OFF failure by which supply of the electric power to all of the electromagnetic valves 29 of the hydraulic control unit 100 is cut off, wire disconnection or the like is caused to cut off supply of the electric power to one or ones of the electromagnetic valves 29, or valve stuck is caused to make the electromagnetic valves 29 suffer from mechanical malfunction. In such a case, even in the event of the TCU failure disabling the shift control, with the electric power being supplied to the other or others of electromagnetic valves 29, the connecting/disconnecting device K0 could be released and/or a certain gear position could be established in the AT shift portion 20, so that the series HV mode could not be established. In view of such a possibility, in this embodiment, a failure-case switch control is executed when the TCU failure is detected by the anomaly detection portion 72. In execution of the failure-case switch control, the power-OFF control portion 232 forcibly stops the power supply to all of the electromagnetic valves 29, so as to release all of the shifting engagement devices CB or the start clutch CS for thereby cutting off the power transmission through AT shift portion 20, while the connecting/disconnecting device K0 is engaged by operation of one of the above-described failure-case connection units 120, 200, 220. Thus, the evacuation running of the vehicle can be performed, with the series HV mode being appropriately established by the series-HV-mode transition control portion 74.

Figure 12:
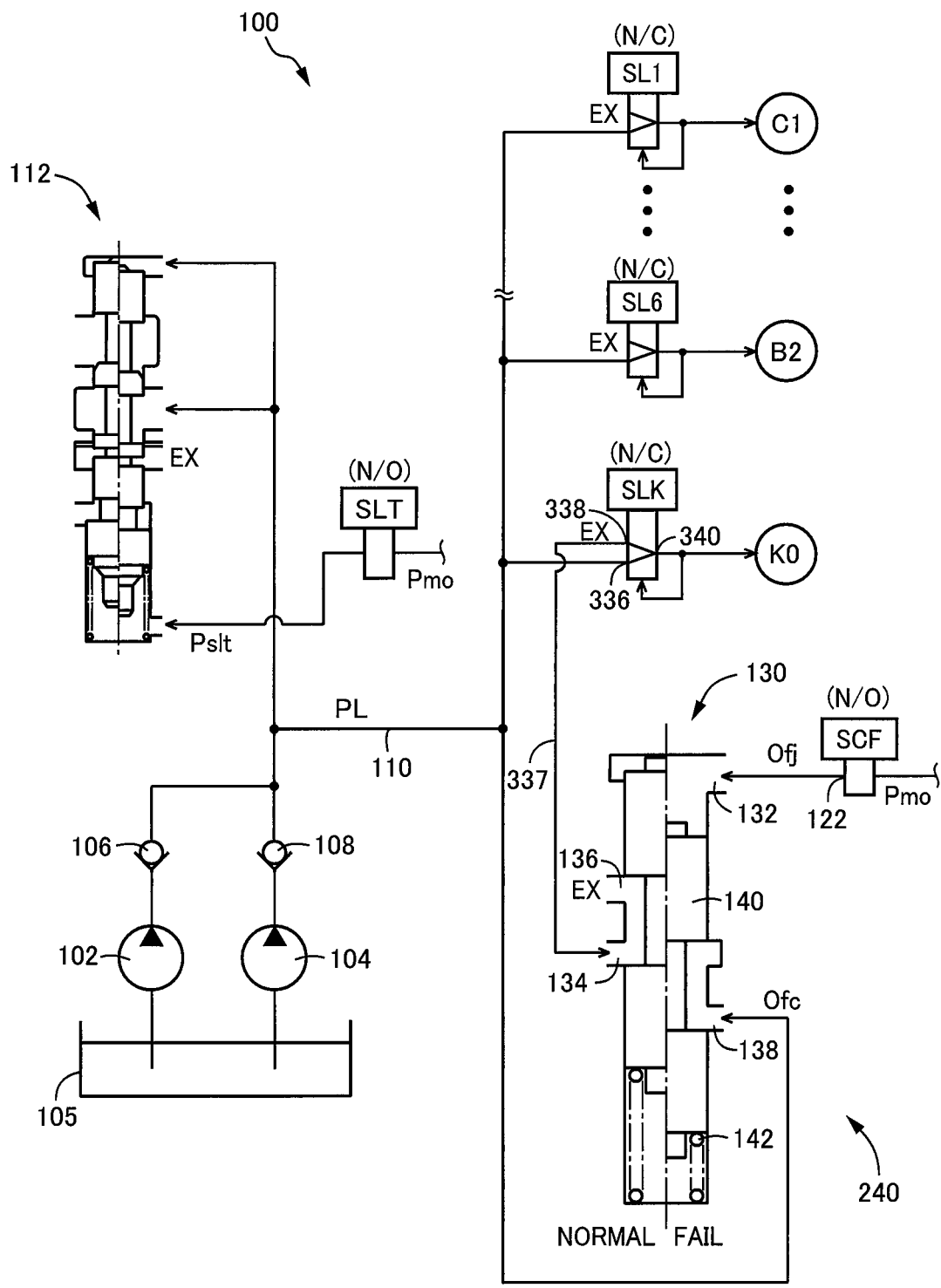
FIG. 12 is a view corresponding to FIG. 4, and is a hydraulic circuit diagram for explaining still another example of the failure-case connection unit for engaging the connecting/disconnecting device K0 in the event of the failure of the TCU.

FIG. 12 shows the hydraulic control unit 100 that is different from the hydraulic control unit 100 of FIG. 4 in that a failure-case connection unit 240 is provided in place of the above-described failure-case connection unit 120. This failure-case connection unit 240 is different from the failure-case connection unit 120 in that the line-pressure fluid passage 110 is connected to the engagement port 138 of the fail-safe valve 130 so that the working fluid regulated to the line pressure PL is supplied as the failure-case engagement fluid Ofc to the engagement port 138. Therefore, in the event of the power OFF failure, when the fail-safe valve 130 is placed in the failure-case connection state with the failure determination fluid Ofj being supplied from the failure-determination electromagnetic valve SCF to the fail-safe valve 130, the working fluid regulated to the line pressure PL is supplied as the failure-case engagement fluid Ofc through the discharge fluid passage 337 and the linear solenoid valve SLK to the hydraulic actuator of the connecting/disconnecting device K0, so that the connecting/disconnecting device K0 is appropriately placed in its connection state based on the line pressure PL.

While the preferred embodiments of the present invention have been described in detail by reference to the drawings, it is to be understood that the embodiments described above are given for illustrative purpose only, and that the present invention may be embodied with various modifications and improvements which may occur to those skilled in the art.

NOMENCLATURE OF ELEMENTS

10: drive apparatus for hybrid vehicle
12: front wheel (one of front and rear wheels)
14; 150: 1M-HV unit (hybrid drive unit)
16: rear wheel (the other of front and rear wheels)
18: e-axle unit (electric drive unit)
20: AT shift portion (automatic transmission)
22: engine
29: electromagnetic valves
70; 230: HV-ECU (hybrid control device)
100: hydraulic control unit
130; 202: fail-safe value
132; 206: switch port
134; 208: connection port
136; 210: drain port
138; 212: engagement port
140: spool
142: spring
337: discharge fluid passage
MG1: first rotating machine
MG2: second rotating machine
K0: connecting/disconnecting device
CB: shifting engagement devices
C1-C4: clutches (shifting engagement devices)
B1, B2: brakes (shifting engagement devices)
SL1-SL6, SLK: linear solenoid valves (electromagnetic valves)
SCF: failure-determination electromagnetic valve
Ofj: failure determination fluid
Ofc: failure-case engagement fluid
PL: line pressure

What is claimed is:

1. A drive apparatus for a hybrid vehicle, the drive apparatus comprising:
    (a) a hybrid drive unit including (a-1) an automatic transmission including a plurality of hydraulically-operated shifting engagement devices and configured to establish a plurality of gear positions depending on engaged/released states of the shifting engagement devices, (a-2) a first rotating machine, and (a-3) an engine connected to the first rotating machine through a hydraulically-operated connecting/disconnecting device such that the engine is disconnectable from the first rotating machine that is disposed in a power transmission path between the automatic transmission and the engine, and wherein the hybrid drive unit is configured to drive one of front and rear wheels of the hybrid vehicle through the automatic transmission, with the engine and the first rotating machine being used as running drive power sources;
    (b) an electric drive unit including a second rotating machine and configured to drive the other of the front and rear wheels, with the second rotating machine being used as a running drive power source;
    (c) a hydraulic control unit including a plurality of electromagnetic valves configured to switch the engaged/released states of the shifting engagement devices and an engaged/released state of the connecting/disconnecting device, the plurality of electromagnetic valves including a fail-safe valve hydraulically connected to the connecting/disconnecting device; and
    (d) a hybrid control device configured, in event of an anomaly that disables a shift control of the automatic transmission, to generate an electric power by causing the first rotating machine to be rotated by the engine and drive the hybrid vehicle to run by causing the second rotating machine of the electric drive unit to be operated with use of the generated electric power, in a state in which a power transmission through the automatic transmission is cut off by shifting each of the shifting engagement devices to the released state and switching the connecting/disconnecting device to the engaged state with the fail-safe valve.

2. A drive apparatus for a hybrid vehicle, the drive apparatus comprising:
    (a) a hybrid drive unit including (a-1) an automatic transmission including a plurality of hydraulically-operated shifting engagement devices and configured to establish a plurality of gear positions depending on engaged/released states of the shifting engagement devices, (a-2) a first rotating machine, and (a-3) an engine connected to the first rotating machine through a hydraulically-operated connecting/disconnecting device such that the engine is disconnectable from the first rotating machine that is disposed in a power transmission path between the automatic transmission and the engine, and wherein the hybrid drive unit is configured to drive one of front and rear wheels of the hybrid vehicle through the automatic transmission, with the engine and the first rotating machine being used as running drive power sources;
    (b) an electric drive unit including a second rotating machine and configured to drive the other of the front and rear wheels, with the second rotating machine being used as a running drive power source;
    (c) a hydraulic control unit including a plurality of electromagnetic valves configured to switch the engaged/released states of the shifting engagement devices and an engaged/released state of the connecting/disconnecting device; and
    (d) a hybrid control device configured, in event of an anomaly that disables a shift control of the automatic transmission, to generate an electric power by causing the first rotating machine to be rotated by the engine and drive the hybrid vehicle to run by causing the second rotating machine of the electric drive unit to be operated with use of the generated electric power, in a state in which a power transmission through the automatic transmission is cut off and the connecting/disconnecting device is engaged, wherein the hydraulic control unit includes:

(c-1) a failure-determination electromagnetic valve configured to switch an output state of a failure determination fluid in event of a power OFF failure by which supply of the electric power to all of the electromagnetic valves is cut off, and (c-2) a fail-safe valve including (c-2-i) a switch port to which the failure determination fluid is to be supplied, (c-2-ii) a connection port connected to a discharge fluid passage through which a working fluid is to be discharged from the connecting/disconnecting device so as to release the connecting/disconnecting device, (c-2-iii) a drain port through which the working fluid supplied to the connection port from the discharge fluid passage is to be drained, and (c-2-iv) an engagement port to which a failure-case engagement fluid is to be supplied for engaging the connecting/disconnecting device, wherein the fail-safe valve is to be switched between a normal-case connection state and a failure-case connection state, such that the connection port and the drain port are in communication with each other for draining the working fluid supplied from the discharge fluid passage when the fail-safe valve is placed in the normal-case connection state, and such that the connection port and the engagement port are in communication with each other for supplying the failure-case engagement fluid to the discharge fluid passage so as to engage the connecting/disconnecting device when the fail-safe valve is placed in the failure-case connection state, and wherein the fail-safe valve is normally placed in the normal-case connection state, and is switched from the normal-case connection state to the failure-case connection state when the output state of the failure determination fluid is switched in the event of the power OFF failure.

3. The drive apparatus according to claim 2, wherein the failure-determination electromagnetic valve is a normally-open electromagnetic valve that is configured to output the failure determination fluid in the event of the power OFF failure, and wherein the fail-safe valve includes a spool and a spring, such that the fail-safe valve is placed in the normal-case connection state, with the spool being held in a normal-side position by a biasing force of the spring, and such that the fail-safe valve is switched from the normal-case connection state to the failure-case connection state, when the failure determination fluid is supplied to the switch port whereby the spool is moved to a failure-side position against the biasing force of the spring.

4. The drive apparatus according to claim 3, wherein the failure determination fluid is supplied as the failure-case engagement fluid to the engagement port of the fail-safe valve.

5. The drive apparatus according to claim 2, wherein the working fluid regulated to a line pressure is supplied as the failure-case engagement fluid to the engagement port of the fail-safe valve.

6. A drive apparatus for a hybrid vehicle, the drive apparatus comprising:

(a) a hybrid drive unit including (a-1) an automatic transmission including a plurality of hydraulically-operated shifting engagement devices and configured to establish a plurality of gear positions depending on engaged/released states of the shifting engagement devices, (a-2) a first rotating machine, and (a-3) an engine connected to the first rotating machine through a hydraulically-operated connecting/disconnecting device such that the engine is disconnectable from the first rotating machine that is disposed in a power transmission path between the automatic transmission and the engine, and wherein the hybrid drive unit is configured to drive one of front and rear wheels of the hybrid vehicle through the automatic transmission, with the engine and the first rotating machine being used as running drive power sources;

(b) an electric drive unit including a second rotating machine and configured to drive the other of the front and rear wheels, with the second rotating machine being used as a running drive power source;

(c) a hydraulic control unit including a plurality of electromagnetic valves configured to switch the engaged/released states of the shifting engagement devices and an engaged/released state of the connecting/disconnecting device; and (d) a hybrid control device configured, in event of an anomaly that disables a shift control of the automatic transmission, to generate an electric power by causing the first rotating machine to be rotated by the engine and drive the hybrid vehicle to run by causing the second rotating machine of the electric drive unit to be operated with use of the generated electric power, in a state in which a power transmission through the automatic transmission is cut off and the connecting/disconnecting device is engaged, wherein the electromagnetic valves are provided for the respective shifting engagement devices in the hydraulic control unit, such that, when the electric power is supplied to each of the electromagnetic valves, a corresponding one of the shifting engagement devices is engaged by a working fluid that is supplied to the corresponding one of the shifting engagement devices from the each of the electromagnetic valves, and such that, when supply of the electric power to each of the electromagnetic valves is stopped, a corresponding one of the shifting engagement devices is released, and wherein the automatic transmission is placed in a power-transmission cut-off state with all of the shifting engagement devices being released, in the event of the anomaly that is a power OFF failure by which supply of the electric power to all of the electromagnetic valves is cut off.

* * * * *